(12) United States Patent
Zhang et al.

(10) Patent No.: US 7,842,412 B2
(45) Date of Patent: Nov. 30, 2010

(54) BATTERY COVER ASSEMBLY FOR PORTABLE ELECTRONIC DEVICE

(75) Inventors: Xin-Fu Zhang, Shenzhen (CN); Shui-Yuan Qin, Shenzhen (CN); Chia-Hua Chen, Tu-cheng (TW); Hsiao-Hua Tu, Tu-cheng (TW)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 1358 days.

(21) Appl. No.: 11/331,493

(22) Filed: Jan. 13, 2006

(65) Prior Publication Data

US 2006/0166083 A1   Jul. 27, 2006

(30) Foreign Application Priority Data

Jan. 21, 2005   (CN)   ............... 2005 2 0054225 U

(51) Int. Cl.
*H01M 2/10* (2006.01)
(52) U.S. Cl. .................... 429/97; 429/96; 429/163
(58) Field of Classification Search ........... 429/96, 429/97, 100, 163, 164, 176, 177, 178
See application file for complete search history.

(56) References Cited

U.S. PATENT DOCUMENTS

| 5,607,792 A | * | 3/1997 | Garcia et al. | ............... 429/97 |
| 7,419,742 B2 | * | 9/2008 | Liu et al. | ............... 429/97 |
| 2008/0042448 A1 | * | 2/2008 | Ge et al. | ............... 292/137 |

* cited by examiner

*Primary Examiner*—Jennifer Michener
*Assistant Examiner*—Monique Wills
(74) *Attorney, Agent, or Firm*—Jeffrey T. Knapp

(57) ABSTRACT

A portable electronic device (100) includes a housing (10), a cover (20) and a latch (30). The housing has a latch receiving portion (150) defined at one end thereof. The battery cover has a button hole (222) therein and includes at least one tab (224). The latch is fixed in the housing. The latch includes a button member (40) and an elastic member (50). The button member resists/biases the elastic member. The button member is received in the button hole of the battery cover and the latch receiving portion of the housing. The tab engages with the latch receiving portion. The elastic member has at least one clasp (56), which locks with a corresponding tab of the battery cover to the housing. When the elastic member is pressed by the button member, the clasp releases the tab. This release provides a user with convenient disassembly mechanism for the device.

18 Claims, 8 Drawing Sheets

BATTERY COVER ASSEMBLY FOR PORTABLE ELECTRONIC DEVICE

BACKGROUND OF THE INVENTION

1. Field of the Invention

The present invention generally relates to battery cover assemblies and, particularly, to a battery cover assembly for use in a portable electronic device.

2. Discussion of the Related Art

Batteries are widely used in portable electronic devices, such as personal digital assistants (PDAs), mobile phones, and so on. Conventional batteries are attachably received in the electronic device, and battery covers are designed to connect with housings of the electronic devices to package the batteries. The batteries have to be replaced by opening the battery covers when the batteries are, e.g., damaged and/or dead (e.g., no longer rechargeable).

A clasp structure or latch structure is used with a conventional battery cover to engage with a housing of a portable electronic device. For example, a mobile phone marked Alcatel OT310 has a latch for the battery cover. The latch includes a pair of hooks at one end of the battery cover and a locking pin protruding from the other end of the battery cover. Accordingly, a pair of grooves is defined in an end portion of a backside of a housing of the mobile phone, and a locking hole is defined in the other end portion of the backside of the housing. In assembly, the hooks are firstly inserted into the troughs in the backside of the housing. Then, the battery cover is pressed downwardly to the housing until the locking pin on the battery cover is inserted into the locking hole in the backside of the housing. The battery cover is thus assembled to the housing of the mobile phone. The battery cover is simple in structure, and the engagement between the battery cover and the housing of the mobile phone is firm, too. However, during disassembly, a relatively great effort is needed to disassemble the battery cover. Therefore, the battery cover is susceptible to damage during such a disassembly procedure. As a result, it is inconvenient for a user to replace a battery in the housing of the mobile phone employing this type of cover latch.

Therefore, a new battery cover assembly is desired in order to overcome the above-described shortcomings.

SUMMARY

A battery cover assembly for a portable electronic device is provided, which is convenient for a user to operate and which is durable.

In one embodiment thereof, the battery cover assembly includes a housing, a cover, and a latch. The housing has a latching portion defined at one end thereof. The battery cover has a button hole defined therein and forms at least one tab. The latch is fixed in the housing. The latch includes a button member and an elastic member. The button member resists the elastic member. The button member is received in the button hole of the battery cover and the latching portion of the housing. The tab engages with the latching portion. The elastic member has at least one clasp, which locks the tab of the battery cover to the housing. When the elastic member is pressed by the button member, the clasp releases the tab. This button-operated latch provides a user with convenient method of disassembling of the cover from the device.

Other advantages and novel features will become more apparent from the following detailed description when taken in conjunction with the accompanying drawings.

BRIEF DESCRIPTION OF THE DRAWINGS

Many aspects of the battery cover assembly can be better understood with reference to the following drawings. The components in the drawings are not necessarily to scale, the emphasis instead being placed upon clearly illustrating the principles of the battery cover assembly. Moreover, in the drawings, like reference numerals designate corresponding parts throughout the several views.

DETAILED DESCRIPTION OF THE EMBODIMENTS

The present invention is suitable for portable electronic devices such as mobile phones, PDAs, and so on.

Figure 1:
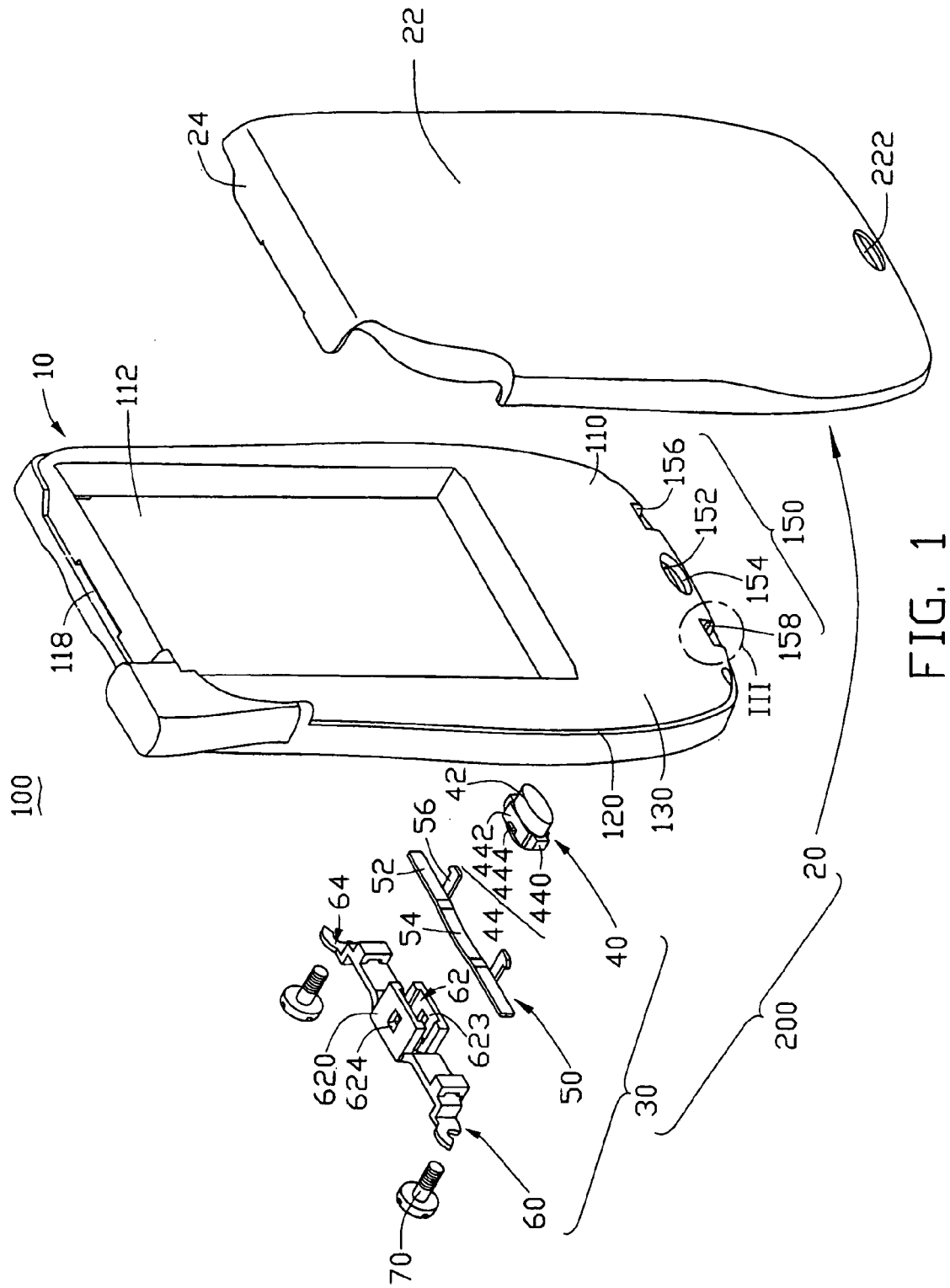
FIG. 1 is an exploded, isometric view of a portable electronic device employing a battery cover assembly, in accordance with a preferred embodiment.
Figure 2:
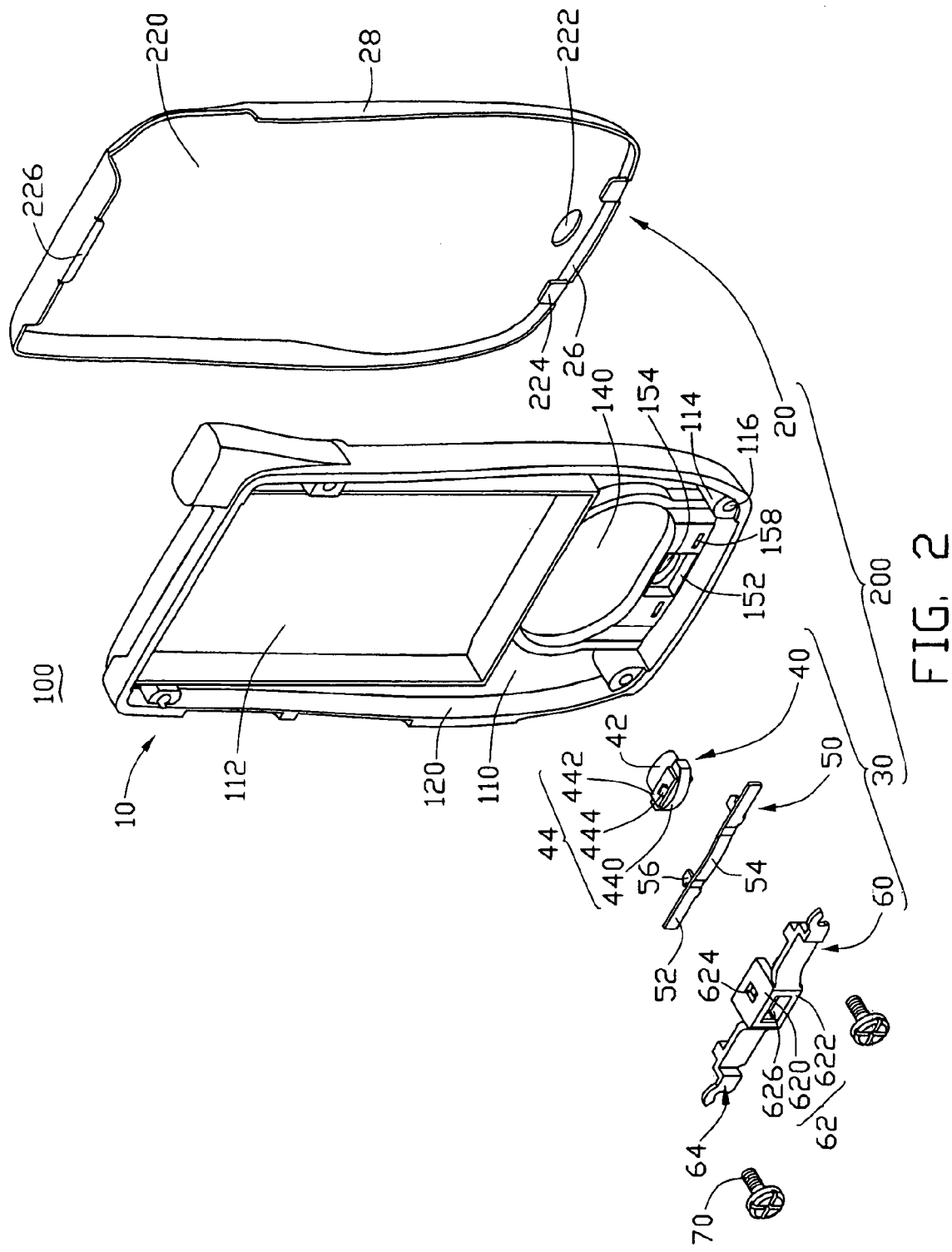
FIG. 2 is similar to FIG. 1, but viewed from another aspect.

Referring now to the drawings in detail, FIG. 1 and FIG. 2 show a portable electronic device 100 (e.g., a mobile phone) employing a battery cover assembly 200. The mobile phone 100 is taken here as an exemplary application, for the purposes of describing details of a battery cover assembly of a preferred embodiment. The mobile phone 100 includes a housing 10 and the battery cover assembly 200. The battery cover assembly 200 incorporates a removable battery cover 20, a latch 30, and two screws 70. The latch 30 is configured for releasably latching (i.e., attaching, locking, engaging) the removable battery cover 20 to the housing 10.

The housing 10 is a back housing of the mobile phone 100. The housing 10 includes a main partition wall 110 and a peripheral sidewall 120. The partition wall 110 separates a first compartment 130 from an opposite second compartment 140. The first compartment 130 is used to engagingly receive the cover 20. The second compartment 140 is configured for accommodating an electronic device (not shown), such as a printed circuit board. This accommodation is achieved when the housing 10 is assembled with other housings (not shown) of the mobile phone 100. The partition wall 110 has a rectangular cavity 112 defined in a middle upper portion and adapted for receiving a battery (not shown) therein. The partition wall 110 has two spaced, symmetrically-opposite fixing portions 114 at a bottom end thereof at the second compartment 140. Each fixing portion 114 is substantially a cylinder and abuts (i.e., adjoins) the peripheral sidewall 120. Each of the fixing portions 114 has a threaded screw hole 116 formed therein.

Figure 3:
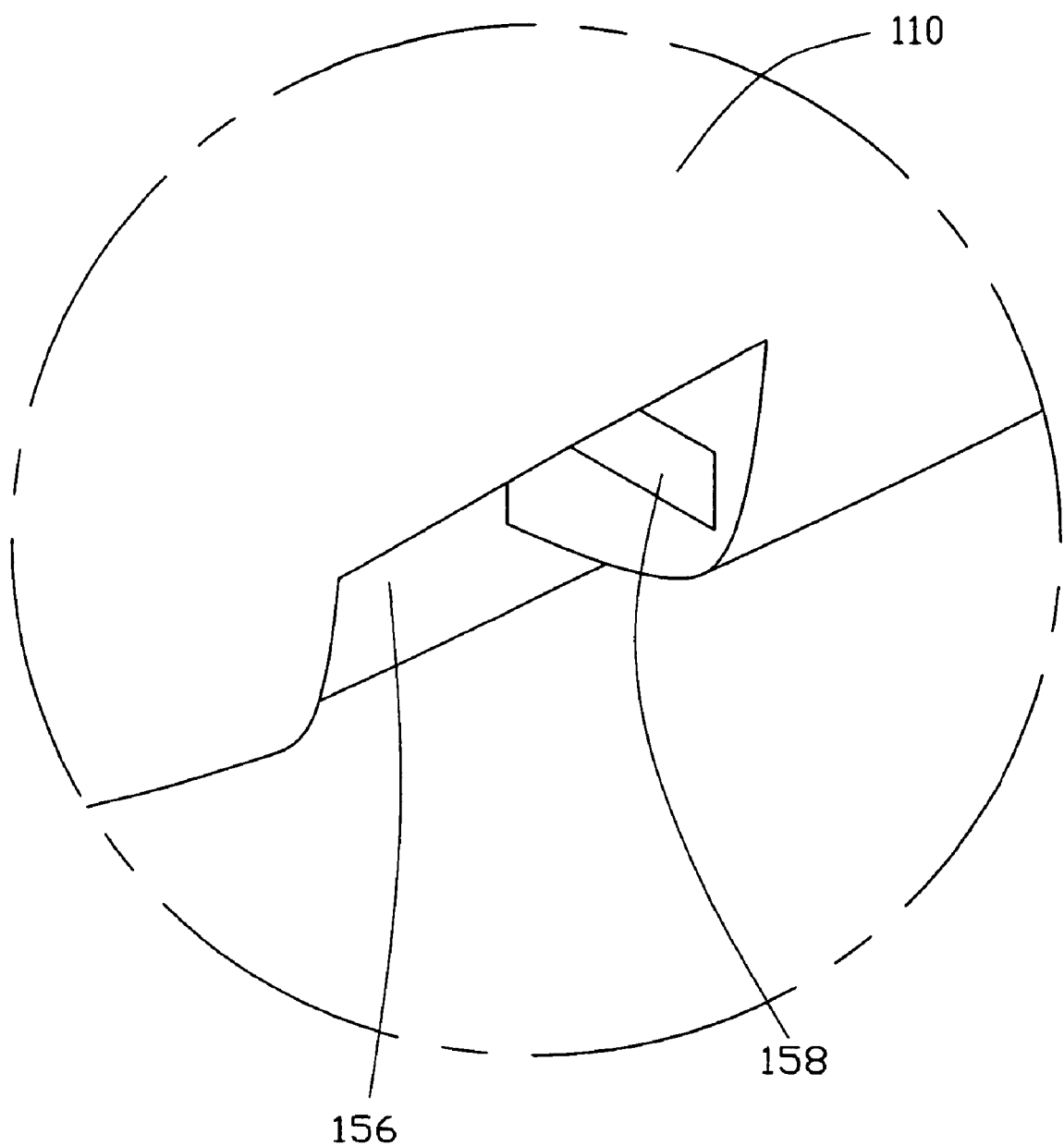
FIG. 3 is an enlarged view of the area III in FIG. 2.

The partition wall 110 has a latch receiving portion 150 formed between the two fixing portions 114. The latch receiving portion 150 includes a retaining aperture or opening 152, a through hole 154, two cutouts 156, and two slots 158 therein. The retaining aperture 152 is defined in the partition wall 110 between the two fixing portions 114. The retaining aperture 152 is substantially a rectangular configuration. The through hole 154 is defined in a bottom wall of the retaining aperture 152 and is substantially elliptical. The through hole 154 communicates with the first compartment 130. The two cutouts 156 are defined at two sides of the through hole 154 at the first compartment 130. The two slots 158 are defined at two sides of the retaining aperture 152 at the second compartment 140. Referring to FIG. 3, each slot 158 communicates with a corresponding cutout 156. The housing 10 further includes a recess 118 formed at a top end of the partition wall 110.

The cover 20 includes a main body 22, a top wall 24, a bottom wall 26 and two opposite sidewalls 28. The main body 22 has an inner surface 220, which together with the top wall 24, the bottom wall 26, and the sidewalls 28, defines a substantially rectangular space (not labeled). An ellipse button hole 222 is defined in a middle lower portion of the main body 22, near the bottom wall 26. Two symmetrically-spaced, L-shaped tabs 224 extend inward and up from the bottom wall 26. The two tabs 224 each correspond to a given cutout 156 of the housing 10. A tongue 226 extends down from the top wall 24. The tongue 226 can engage (i.e., be received) in the recess 118 of the housing 10.

Figure 4:
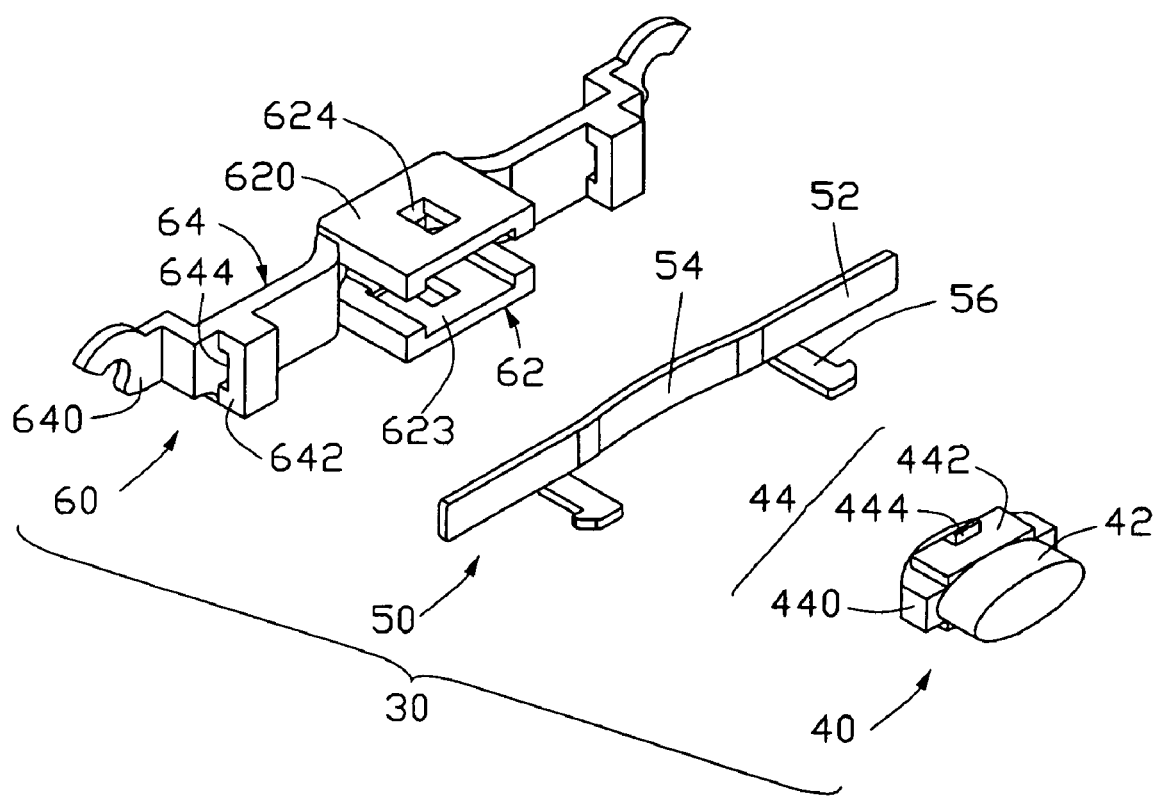
FIG. 4 is an enlarged, exploded view of the latch shown in FIG. 1.

Referring to FIG. 4, the latch 30 includes a button member 40, an elastic member 50, and a support member 60. The button member 40 is made up of a button portion 42 and a pressing portion 44. The button portion 42 is substantially an elliptical block. A cross-sectional configuration dimension of the button portion 42 is the same or slightly smaller than that of each of the through hole 154 of the housing 10 and/or the button hole 222 of the cover 20. Accordingly, the button portion 42 can be received in the through hole 154 and the button hole 222, the elliptical shape of each helping to promote the steady positioning of the button portion 42 relative to each of the through hole 154 and the button hole 222. The pressing portion 44 has an arcuate section 440. A block section 442 perpendicularly intersects with the arcuate section 440 and extends from two sides (i.e., from above and below) of the arcuate section 440. The block section 442 has a respective wedge section 444 extending from each of the two sides thereof.

The elastic member 50 is substantially a long board and is made from an elastic material, such as a metal or plastic displaying a sufficient spring quality. The elastic member 50 includes a main board 52, which has a resisting portion 54 in a middle thereof. The resisting portion 54 is a slightly concave (i.e., depressed) toward one side of the main board 52, thereby increasing the spring tendency of this section. The arcuate section 440 of the pressing portion 44 is adapted to be received by the corresponding resisting portion 54 and may resist thereon. The resisting portion 54 advantageously is elastically deformable, but not plastically so, under a force from the pressing portion 44. The main board 52 has two clasps (i.e., hooks, catches) 56 perpendicularly extending from one side thereof, one from either side of the resisting portion 54. Each clasp 56 can be inserted into a given slot 158 of the housing 10. When each clasp 56 engages with a given slot 158, a distal, operative end of the respective clasp 56 is exposed from (i.e., extends through) the cutout 156.

The support member 60 has a receiving/retaining portion 62 and two arm portions 64. The retaining portion 62 is made up of two side plates 620 and a base plate 622, which together form a space 623. The space 623 of the receiving portion 62 is shaped and otherwise configured for accommodating the pressing portion 44 of the button 40. Each side plate 620 defines a locking groove or slot 624, which is substantially rectangular. Each wedge section 444 is advantageously inserted into and received by a corresponding locking groove 624, with each wedge section being designed to selectably move up and/or down. The base plate 622 has a receiving groove 626 defined therein, which may partially receive the resisting portion 54 of the elastic member 50. The arm portions 64 are symmetrically formed at the two sides of the receiving portion 62. Each of the arm portions 64 has a fixing section 640 at a distal end, which is approximately C-shaped. The screw 70 can pass through the fixing section 640 and be fixed in the fixing portion 114 of the housing 10. Two projecting sections 642 are respectively formed on each of the arm portions 64. Each of the projecting sections 642 has a fixing slot or opening 644. Two ends of the elastic member 50 can be inserted into the respective fixing slots 644 and thereby be fixed in and to the support member 60.

Figure 5:
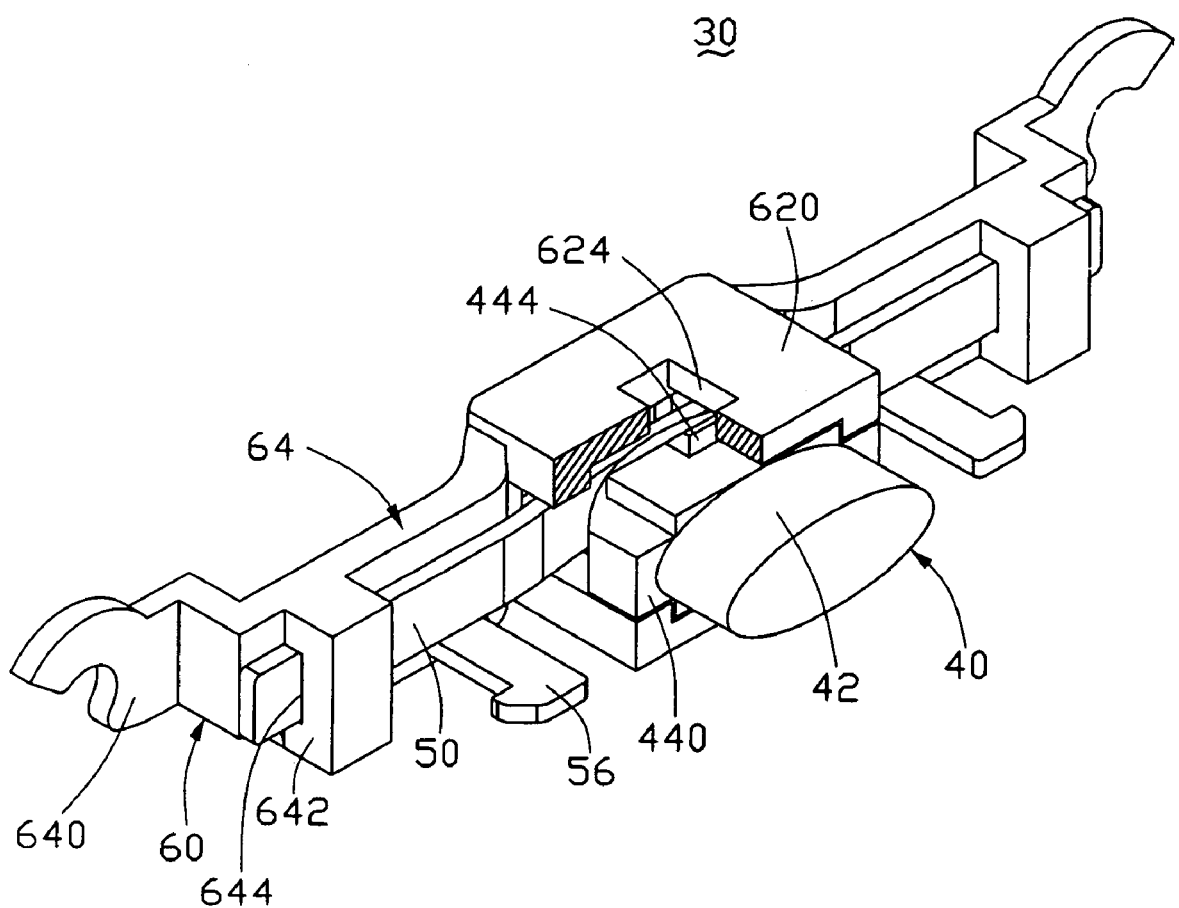
FIG. 5 is an enlarged, assembled view of the latch shown in FIG. 4.

In assembly, referring now to FIG. 5, the elastic member 50 is disposed on the support member 60, and the two ends of the elastic member 50 are respectively inserted into a given fixing slot 644. The resisting portion 54 is received in the space 623 of the receiving portion 62 of the support member 60. Accordingly, the elastic member 50 is fixed in the support member 60. The button member 40 is aligned with the space 623 of the receiving portion 62. Then, the button member 40 is pressed into the space 623, and the block section 442 engages with the space 623. At the same time, the arcuate section 440 resists (i.e., biases against) the resisting portion 54. Each wedge section 444 is slidably engaged into a given locking groove 624 of the side plate 620. The button member 40 is thus connected together with the elastic member 50 and the support member 60.

Figure 6:
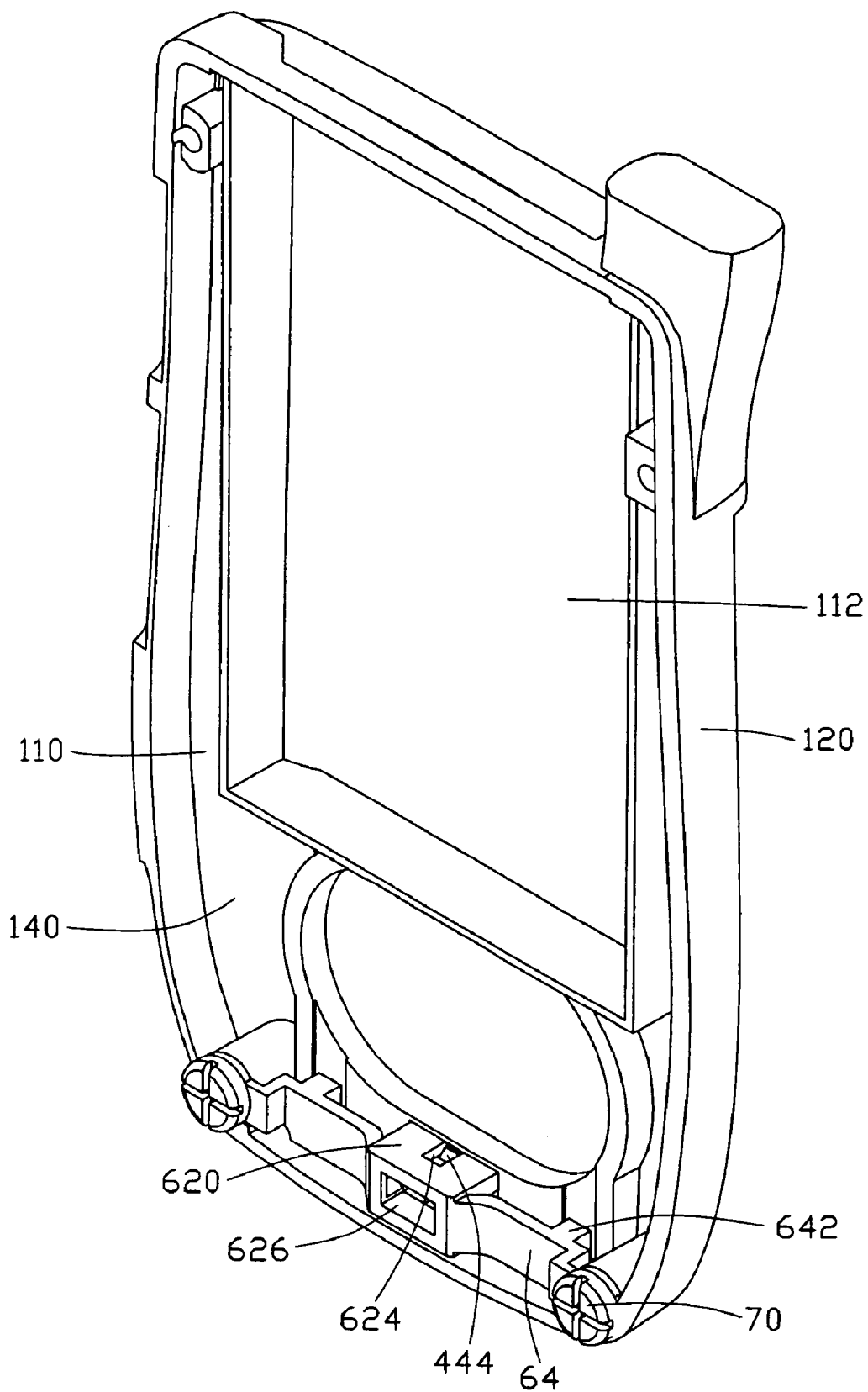
FIG. 6 is an assembled view of the housing and the latch in FIG. 1.
Figure 7:
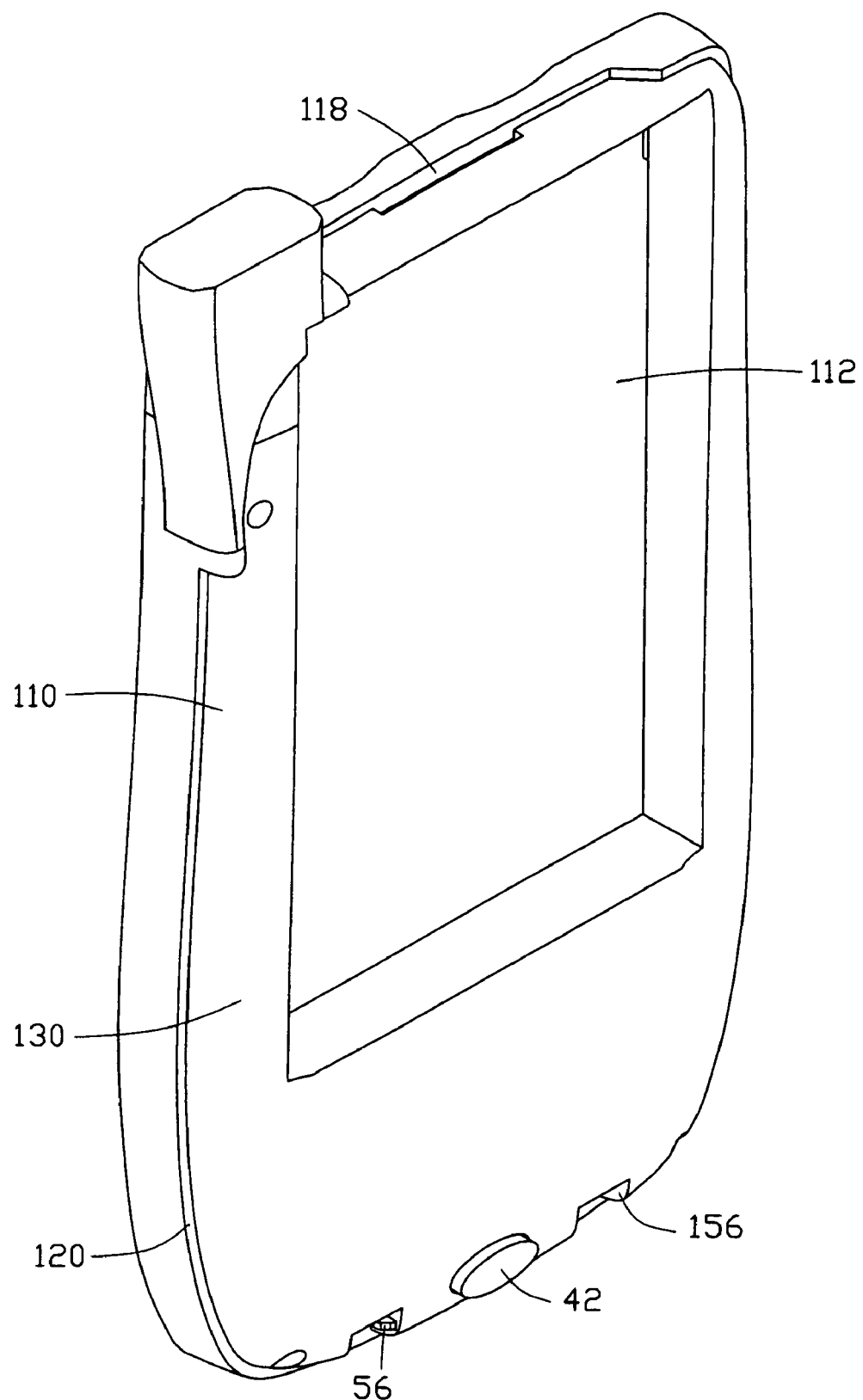
FIG. 7 is similar to FIG. 6, but viewed from another aspect.
Figure 8:
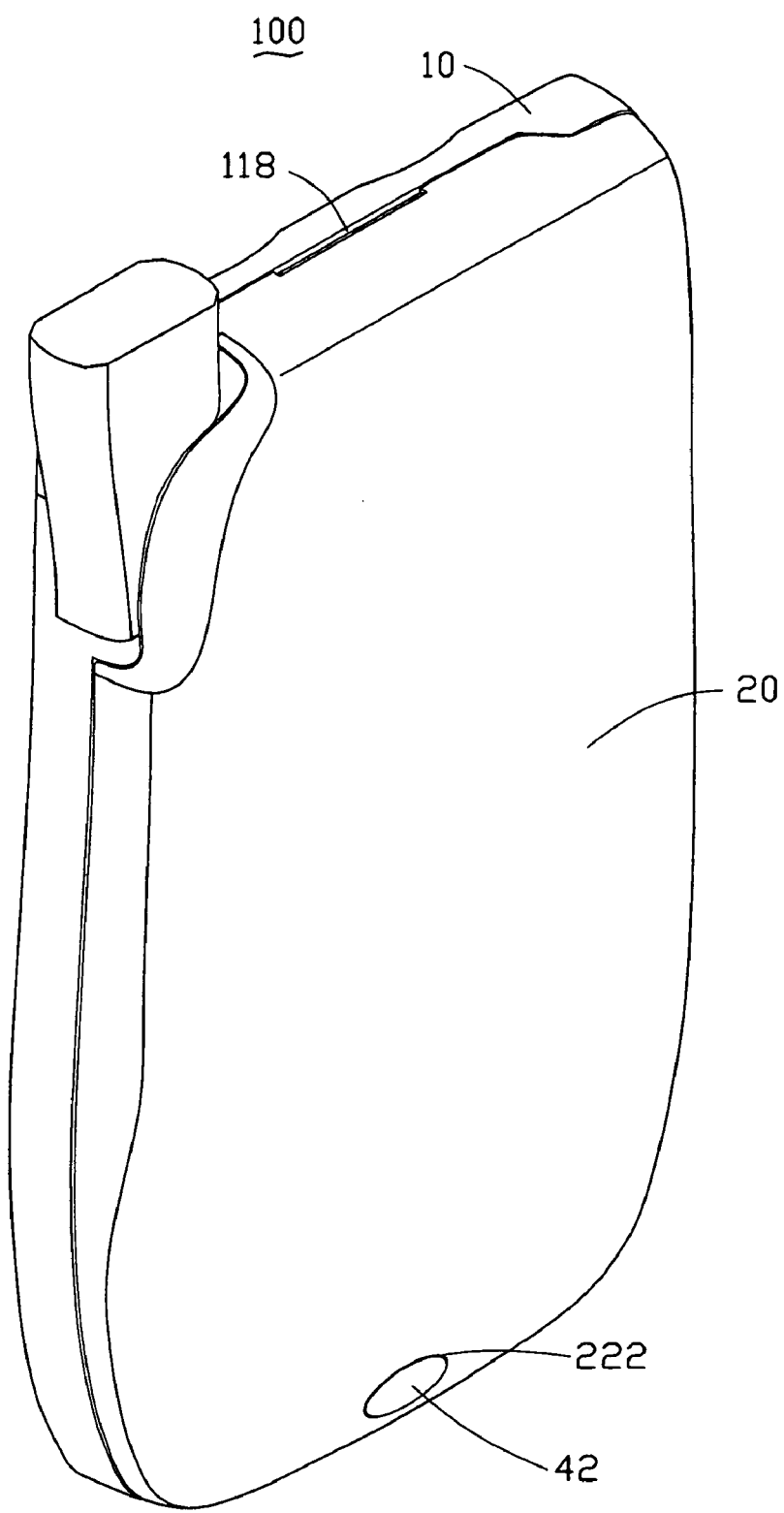
FIG. 8 is an assembled view of the portable electronic device shown in FIG. 1.

Referring now to FIGS. 6 to 8, the latch 30 is disposed over the latch receiving portion 150 of the housing 10 at the second compartment 140. The button portion 42 of the button member 40 is aligned with the through hole 154 of the housing 10. At the same time, the fixing sections 640 of the support member 60 are aligned with the corresponding fixing portions 114 of the housing 10. The clasps 56 of the elastic member 50 are aligned with the corresponding slots 158 of the latch receiving portion 150. Next, the receiving portion 62 of the support member 60 is pressed into the retaining aperture 152 of the housing 10, and the clasps 56 of the elastic member 50 are inserted into the slots 158 of the housing 10. Then, the fixing sections 640 of the support member 60 are disposed on the fixing portions 114 of the housing 10, and the screws 70 are screwed into the screw holes 116 of the fixing portions 114. Accordingly, the latch 30 is mounted in the housing 10. The button portion 42 of the button member 40 is shown, per FIG. 7, to extend into and from the through hole 152, and the clasps 56 of the elastic member 50 are exposed from the cutout 156 of the housing 10.

With the latch 30 mounted on the housing 10, the next step is for the cover 20 to be mounted in the housing 10. First, the inner surface 220 of the cover 20 is directed toward the first compartment 130 of the housing 10. The tabs 224 are inserted into the cutouts 156 of the housing 10, thereby engaging the latch receiving portion 150 of the housing 10. At the same time, the tongue 226 of the cover 20 is positioned relative the recess 118 of the housing 10. Next, the cover 20 is pressed onto the housing 10. The tabs 224 push the clasps 56 of the elastic member 50 in the cutout 156 of the housing 10 and are locked into the clasps 56. The tongue 226 is received in the recess 118 of the housing 10. Accordingly, the cover 20 is thus removably attached on the housing 10.

When the cover 20 is detached from the housing 10, the button member 40 is pushed down by a user's finger. The pressing portion 44 is caused to slide relative to the support member 60 and, particularly, toward the base plate 622 thereof, and the wedge sections 44 slide along/down in the locking groove 624. Further, the pressing portion 44 pushes the resisting portion 54 of the elastic member 50. The resisting portion 54 bends/deforms toward the base plate 622. The deformation of the resisting portion 54 further brings the outer portions of the main board 52 to toward the center of the main board 52 (i.e., toward the pressing portion 44 of the button member 40). Accordingly, such deflection of the main board 52 cause the clasps 56 of the elastic member 50 to move out from the slots 158 of the housing 10 and disengage the tabs 224 of the cover 20. The cover 20 is then raised, and the button portion 42 of the button member 40 dislodges from the button hole 222 of the cover 20. Further, the tongue 226 of the cover 20 is unhooked from the recess 118 of the housing 10. Finally, the cover 20 is taken away from the housing 10.

In alternative embodiments, the latch 30 may be fixed in the fixing portions 114 of the housing 10 by means of adhesion and/or welding.

As described above, the preferred embodiment provides a battery cover assembly for portable electronic devices, such as mobile phones. When the button is pushed, the cover of the battery cover assembly can be easily removed. This push-button removal step provides the user with convenient operation of the device.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

We claim:

1. A portable electronic device comprising:
a housing defining a latch receiving portion;
a battery cover having a button hole therein and defining at least one tab; and
a latch fixed in the housing, the latch including a button member, an elastic member and a support member, the button member resisting the elastic member, the elastic member being attached to the support member, the support member being fixed in the housing, the button member being received in the button hole of the battery cover and the latch receiving portion of the housing, the support member including a receiving portion, the elastic member including a resisting portion, the resisting portion being received in the receiving portion, the button member including a button portion and a pressing portion, and the pressing portion biasing against the resisting portion of the elastic member and being received in the receiving portion of the support member, each tab being positioned proximate the latch receiving portion, the elastic member having at least one clasp, each clasp locking with a corresponding tab of the battery cover to thereby join the cover to the housing, the latch being configured such that, when the elastic member is pressed by the button member, the elastic member slides toward the button member and each clasp releases the tab corresponding thereto.

2. The portable electronic device as claimed in claim 1, wherein the latch receiving portion includes a through hole, the button member engaging with the through hole.

3. The portable electronic device as claimed in claim 2, wherein the latch receiving portion further comprises at least one cutout and at least one slot, each cutout and each slot are respectively defined in one side of the through hole, each cutout communicates with a corresponding slot, each tab engages with a corresponding cutout, and each clasp extends through a corresponding slot and locks with a given tab of the cover.

4. The portable electronic device as claimed in claim 1, wherein the receiving portion is made up of two side plates and a base plate, the base plate and two plates forms a space, the space receives the pressing portion of the button member and the resisting portion of the elastic member.

5. The portable electronic device as claimed in claim 4, wherein the latch receiving portion further comprises a retaining aperture and a through hole, the through hole communicates with the retaining aperture, and the two side plates of the receiving portion are received in the retaining aperture.

6. The portable electronic device as claimed in claim 5, wherein the latch receiving portion further comprises two cutouts and two slots, each cutout has a corresponding slot in communication therewith, the two cutouts are respectively defined at opposite sides of the through hole, the tabs engage with the cutouts, and the clasps extend through the slots and lockingly engage with the tabs of the cover.

7. The portable electronic device as claimed in claim 4, wherein the button portion, the button hole, and the through hole are ellipse-shaped.

8. The portable electronic device as claimed in claim 7, wherein the pressing portion includes an arcuate section and a wedge section, the side plates respectively define a locking slot, the wedge section engages with the locking slots.

9. The portable electronic device as claimed in claim 8, wherein the resisting portion of the elastic member is concave, the arcuate section resists with the resisting portion.

10. The portable electronic device as claimed in claim 1, wherein the support member further comprises two arm portions, the two arm portions are formed at two opposing sides of the receiving portion of the support member, each arm portion defines a projecting section with a fixing slot, and each end of the elastic member is inserted into a corresponding fixing slot.

11. The portable electronic device as claimed in claim 10, wherein two fixing sections are respectively formed at a distal end of the arm portions, and each fixing section is attached to the housing by means of a screw.

12. The portable electronic device as claimed in claim 1, wherein the battery cover comprises two tabs, the elastic member comprises two corresponding clasps, the clasps being configured for locking the corresponding tabs of the battery cover to the housing, and the elastic member being configured such that, when the elastic member is pressed by the button member, the elastic member deflects in manner so as to release each clasp from the tab corresponding thereto.

13. The portable electronic device as claimed in claim 1, wherein the housing has a recess formed at a top end in the housing, a tongue is formed at an end of the cover opposite to the end having the at least one tab associated therewith, and the tongue is configured for insertion into the recess.

14. A portable electronic device comprising:
a housing;
a battery cover having at least one tab; and
a latch fixed in the housing, the latch including:
a support member fixed in the housing, the support member including a receiving portion;
an elastic member including a resisting portion and at least one clasp, the resisting portion received in the receiving portion, each clasp locking with a corresponding tab of the battery cover to thereby join the cover to the housing;
a button member biasing against the resisting portion of the elastic member, each clasp releasing the tab when the elastic member is pressed by the button member.

15. The portable electronic device as claimed in claim 14, wherein the button member includes a pressing portion, the receiving portion is made up of two side plates and a base plate, the base plate and two plates forms a space, the space receives the pressing portion of the button member and the resisting portion of the elastic member.

16. The portable electronic device as claimed in claim 15, wherein the pressing portion includes an arcuate section and a wedge section, the side plates respectively define a locking slot, the wedge section engages with the locking slots.

17. The portable electronic device as claimed in claim 14, wherein the support member further comprises two arm portions, the two arm portions are formed at two opposing sides of the receiving portion of the support member, each arm portion defines a projecting section with a fixing slot, and each end of the elastic member is inserted into a corresponding fixing slot.

18. The portable electronic device as claimed in claim 17, wherein two fixing sections are respectively formed at a distal end of the arm portions, and each fixing section is attached to the housing by means of a screw.

\* \* \* \* \*